US010650164B2

(12) United States Patent
Gouget et al.

(10) Patent No.: US 10,650,164 B2
(45) Date of Patent: May 12, 2020

(54) SYSTEM AND METHOD FOR OBFUSCATING AN IDENTIFIER TO PROTECT THE IDENTIFIER FROM IMPERMISSIBLE APPROPRIATION

(71) Applicant: GEMALTO SA, Meudon (FR)

(72) Inventors: Aline Gouget, Meudon (FR); Dan Tam Pham, Meudon (FR)

(73) Assignee: THALES DIS FRANCE SA, Meudon (FR)

( * ) Notice: Subject to any disclaimer, the term of this patent is extended or adjusted under 35 U.S.C. 154(b) by 100 days.

(21) Appl. No.: 15/541,322

(22) PCT Filed: Dec. 30, 2015

(86) PCT No.: PCT/EP2015/081390
§ 371 (c)(1),
(2) Date: Jun. 30, 2017

(87) PCT Pub. No.: WO2016/107893
PCT Pub. Date: Jul. 7, 2016

(65) Prior Publication Data
US 2017/0357826 A1      Dec. 14, 2017

(30) Foreign Application Priority Data

Dec. 31, 2014  (EP) .................................... 14307222

(51) Int. Cl.
*G06F 21/00*       (2013.01)
*G06F 21/62*       (2013.01)
(Continued)

(52) U.S. Cl.
CPC ...... *G06F 21/6254* (2013.01); *G06F 16/9535* (2019.01); *G06F 21/6245* (2013.01); *H04L 63/0428* (2013.01); *G06F 21/31* (2013.01)

(58) Field of Classification Search
CPC .. G06F 21/6245; G06F 21/31; G06F 21/6254; G06F 16/9535; H04L 63/0428
(Continued)

(56) References Cited

U.S. PATENT DOCUMENTS 7,409,061 B2 * 8/2008 Newcombe ............. A63F 13/12
                                                          380/251
8,601,263 B1 * 12/2013 Shankar ............. H04L 63/0428
                                                          713/166
(Continued)

OTHER PUBLICATIONS

NPL Search Results (Year: 2019).*
(Continued)

*Primary Examiner* — Syed A Zaidi
(74) *Attorney, Agent, or Firm* — The Jansson Firm; Pehr B. Jansson (57) ABSTRACT

A system and method of operating a database system to protect personal identifiers from being revealed. The system and method obfuscates personal identifiers using a secret value, storing in a database records containing the obfuscated personal identifier, storing the secret value in a identifier translation device, receiving at a request preparer a record request identifying a requested record using a non-obfuscated personal identifier, and operating the request preparer to direct the identifier translation device to translate the non-obfuscated personal identifier into an obfuscated personal identifier using the secret value stored in the identifier translation device and using the obfuscated personal identifier in a query to the database.

22 Claims, 9 Drawing Sheets

100

| PubID | Data Fields |
|---|---|
| 123-45-6789 | Hal Mikkelson, ..... |
| 987-65-4321 | Claire Greystone, .... |
| 675-45-3456 | Will Treaty, ... |
| 456-78-3456 | Violet Baudelaire, ... |
| 456-55-7896 | Hjalmar Vilhjalmarsson,... |

100'

| PubID | Data Fields |
|---|---|
| hash(123-45-6789) | Hal Mikkelson, ..... |
| hash(987-65-4321) | Claire Greystone, .... |
| hash(675-45-3456) | Will Treaty, ... |
| hash(456-78-3456) | Violet Baudelaire, ... |
| hash(456-55-7896) | Hjalmar Vilhjalmarsson,... |

(51) Int. Cl.
*G06F 16/9535* (2019.01)
*H04L 29/06* (2006.01)
*G06F 21/31* (2013.01)

(58) Field of Classification Search
USPC .................................................. 726/28
See application file for complete search history.

(56) References Cited

U.S. PATENT DOCUMENTS

| | | | | |
|---|---|---|---|---|
| 2002/0077992 | A1* | 6/2002 | Tobin | G06Q 20/02 |
| | | | | 705/65 |
| 2002/0133707 | A1* | 9/2002 | Newcombe | A63F 13/12 |
| | | | | 713/183 |
| 2002/0178366 | A1* | 11/2002 | Ofir | G06F 21/6245 |
| | | | | 713/182 |
| 2004/0005059 | A1* | 1/2004 | Suzuki | H04L 9/3231 |
| | | | | 380/277 |
| 2005/0015471 | A1* | 1/2005 | Zhang | H04L 63/0442 |
| | | | | 709/221 |
| 2005/0033994 | A1* | 2/2005 | Suzuki | H04L 63/083 |
| | | | | 726/19 |
| 2005/0185644 | A1* | 8/2005 | Tsuji | H04L 29/06 |
| | | | | 370/389 |
| 2006/0085651 | A1* | 4/2006 | Staddon | G06F 21/6227 |
| | | | | 713/193 |
| 2007/0274525 | A1* | 11/2007 | Takata | H04L 63/065 |
| | | | | 380/270 |
| 2008/0235809 | A1* | 9/2008 | Weinstein | G06F 21/78 |
| | | | | 726/28 |
| 2009/0257595 | A1* | 10/2009 | de Cesare | G06F 21/575 |
| | | | | 380/277 |
| 2014/0052999 | A1 | 2/2014 | Aissi et al. | |

OTHER PUBLICATIONS

PCT/EP2015/081390, International Search Report, dated Feb. 26, 2016, European Patent Office, P.B. 5818 Patentlaan 2 NL—2280 HV Rijswijk.

PCT/EP2015/081390, Written Opinion of the International Searching Authority, dated Feb. 26, 2016, European Patent Office, D-80298 Munich.

Elgamal, Taher, A Public Key Cryptosystem and a Signature Scheme Based on Discrete Logarithms, IEEE Transactions on Information Theory, vol., IT-31, No. 4, pp. 469-472, Jul. 1985.

Paillier, Pascal, Public-Key Cryptosystems Based on Composite Degree Residuosity Classes, GEMPLUS Sryptography Department 34 Rue Guynemer, 92447 Issy-les-Moulineaux, ENST Computer Science Department, 46, rue Barrault, 75634 Paris Cedex 13, Published in J. Stem, Ed., Advances in cryptology—EUROCRYPT99, vol. 1592 of Lecture Notes in computer Science, pp. 223-238, Springer-Verlag, 1999.

Benaloh, Josh, Dense Probabilistic Encryption,Clarkson University, https://www.microsoft.com/en-us/research/wp-content/uploads/1999/02/dpe.pdf, pp. 120-128, 1994.

Goldwasser, Shafi and Micali, Silvio, Probabilistic Encryption*, Laboratory of Computer Science, Massachusetts Institute of Technology, Cambridge, Massachusetts 02139, Journal of Computer and Systems Sciences vol. 28, pp. 270-299, 1984.

* cited by examiner

100

| PubID | Data Fields |
|---|---|
| 123-45-6789 | Hal Mikkelson, ..... |
| 987-65-4321 | Claire Greystone, .... |
| 675-45-3456 | Will Treaty, ... |
| 456-78-3456 | Violet Baudelaire, ... |
| 456-55-7896 | Hjalmar Vilhjalmarsson,... |

100'

| PubID | Data Fields |
|---|---|
| hash(123-45-6789) | Hal Mikkelson, ..... |
| hash(987-65-4321) | Claire Greystone, .... |
| hash(675-45-3456) | Will Treaty, ... |
| hash(456-78-3456) | Violet Baudelaire, ... |
| hash(456-55-7896) | Hjalmar Vilhjalmarsson,... |

| ObfID | Data Fields |
|---|---|
| f(123-45-6789,SecretValue) | Hal Mikkelson, ..... |
| f(987-65-4321,SecretValue) | Claire Greystone, .... |
| f(675-45-3456,SecretValue) | Will Treaty, ... |
| f(456-78-3456,SecretValue) | Violet Baudelaire, ... |
| f(456-55-7896,SecretValue) | Hjalmar Vilhjalmarsson,... |

*Fig. 9*

SYSTEM AND METHOD FOR OBFUSCATING AN IDENTIFIER TO PROTECT THE IDENTIFIER FROM IMPERMISSIBLE APPROPRIATION

BACKGROUND OF THE INVENTION

The present invention relates generally to protecting electronic devices against attacks designed to discern secret information stored in databases, and in particular, to protecting an electronic device from revealing database content indexed by a personal identifier.

Electronic communication and commerce are powerful yet dangerous tools. With the widespread availability of network technology, such as the Internet, there is an ever-increasing use of online tools for communication and commerce. Each year more users find it easier or quicker to conduct important transactions, whether in the form of correspondence or commerce, using computers and other computerized devices over computer networks. However, there is always the risk that the security of electronic data that is the foundation of many important online activities can be compromised through appropriation by third parties who do not have the right to access that data. News reports are plentiful describing how hackers have obtained access to databases of commercial and governmental institutions by stealing parts of or entire databases from which personal identifiers and associated data have been obtained. Such losses are extremely costly to the institutions involved both in terms of direct losses and in terms of loss of goodwill and trust.

Personal information, i.e., information associated with particular individuals, is often indexed in databases using a personal identifier. Such personal identifiers include, for example, national identification numbers, e.g., US Social Security Number and French INSEE code, Primary Account Numbers (PAN), and identifiers associated with particular personal devices, e.g., transportation card ID numbers. Such numbers are static and are known to legitimate record preparers and record requesters. Herein, the raw identifiers are referred to as PubID.

Personal identifiers are considered sensitive for the following reasons:
  The knowledge of the identifier may be sufficient to allow fraudulent use of the attached account or personal device.
  The identifier can allow access to records linked to it (in fact, it is possible but not mandatory that the user had been authenticated prior to request a record).
  As the identifier used by the user is static, there is a significant risk regarding the possibility of linking information identified by the same identifier across several databases.

Typically, to protect the identifiers, the identifiers are transformed into a modified form prior to storing data in a database by the records preparer and conversely the request preparer uses the modified form to access the data. One mechanism is to simply hash the PubID, i.e.:

ModID=hash(PubID)

While the hash is a one-way function, and therefore, the ModID cannot be directly computed from the PubID, a hacker may nevertheless derive ModID by performing an exhaustive search of possible PubID values that produce ModID.

To somewhat mitigating that possibility, a salt, e.g., a random number, may be added as a hash parameter:

ModID=hash(PubID,salt)

The salt is stored in the database or publicly available, e.g., available on the record requester. However, even so, in the event a ModID value is intercepted or a database theft, an attacker can perform an exhaustive search on the possible PubID and ModID values to obtain the PubID value from given ModID values. While the salt adds to the time required, it is not sufficient to perfectly protect PubID from being revealed.

From the foregoing it will be apparent that there is still a need for an improved technology to provide a secure mechanism to protect personal identifiers from being revealed from an intercept of a modified personal identifier or from theft of a partial or entire database. Such a protection mechanism should protect PubID from being retrieved in the event the index ModID is intercepted, the database is breached or the database is stolen. Further, it should not be possible for a hacker to link information by one identifier across to other databases.

DETAILED DESCRIPTION OF THE INVENTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In an embodiment of the invention, a technology is provided for preventing the misappropriation of personal identifiers from the interception of database indices or partial or entire theft of databases.

Figure 1:
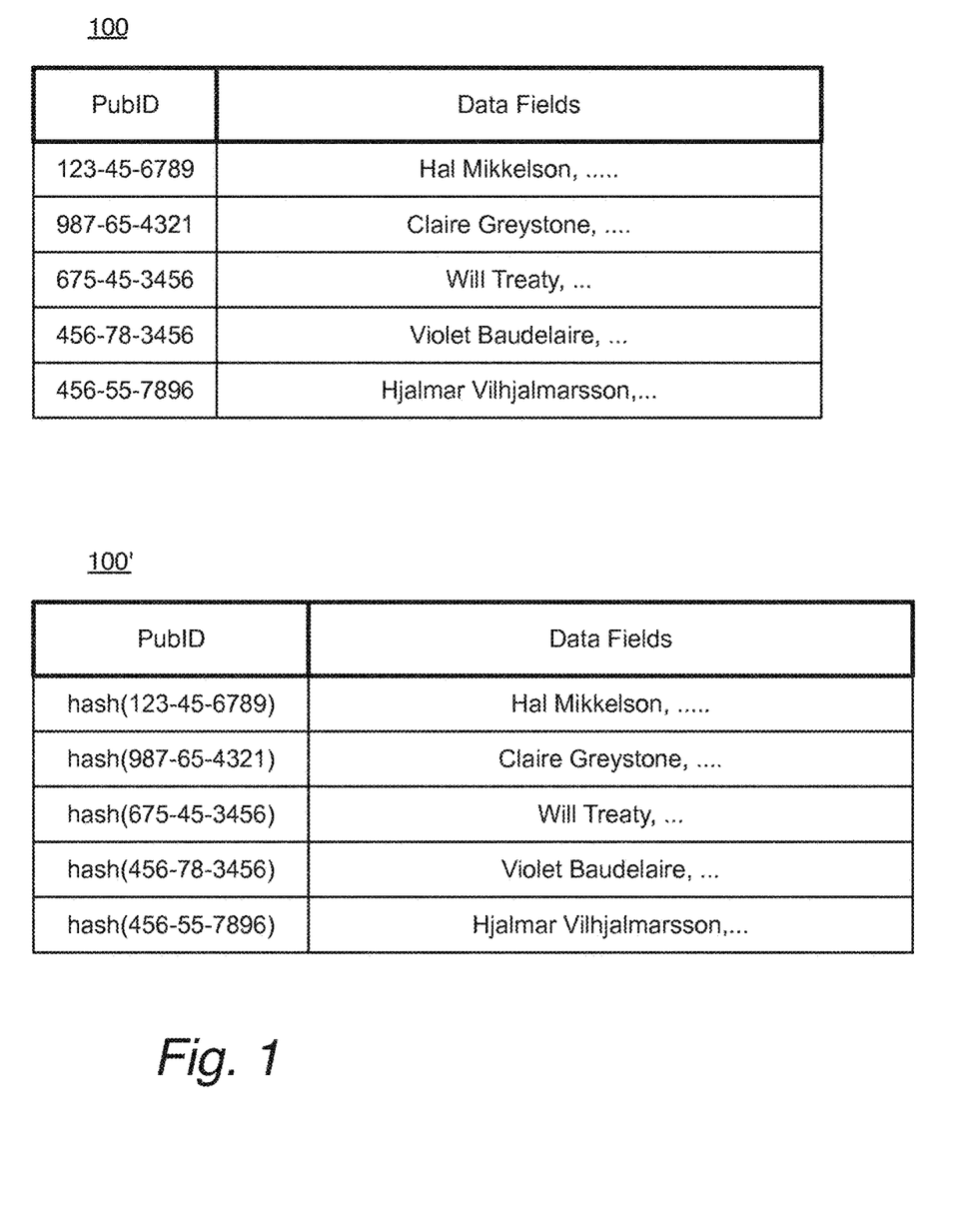
FIG. 1 is a simplified view of a database table indexed using a personal identifier and the same database table indexed using a hashed identifier.

FIG. 1 is a simplified view of a database table 100. The table is indexed using PubID. Here PubID has the format of United States Social Security Numbers. However, PubID may be any identifier that is a personal one-to-one association between a number (or other identifier) and a person or a device. Other examples include Primary Account Numbers (PAN), national identity numbers, and ID numbers associated with particular devices, e.g., transportation ID numbers. One mechanism to protect the personal identifier is to store a modified form of the personal identifier, herein referred to as ModID. A ModID is some form of one-way modification of PubID. One example is a hash of PubID:

ModID=hash (PubID).

Thus, in the example database, either records are stored indexed by PubID or ModID. Database 100' of FIG. 1 is an illustration of records stored in a database table indexed by ModID. Naturally where the illustrations shows "hash(123-45-6789)" what would actually be stored is the result of that operation.

Figure 2:
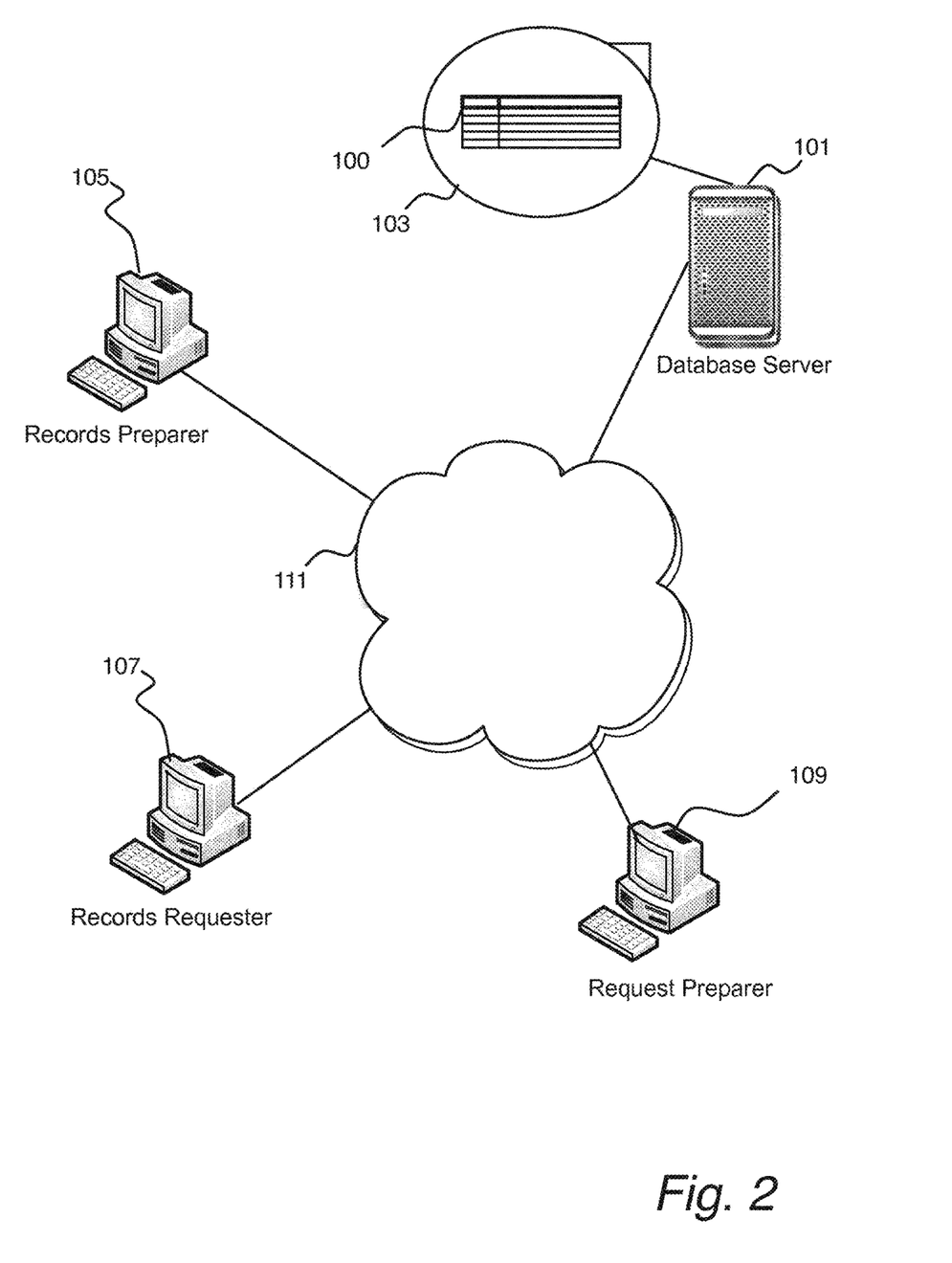
FIG. 2 illustrates a high-level schematic of a network organization for use of the database of FIG. 1.

FIG. 2 illustrates a high-level schematic of a network organization for use of the database 100. The database 100 may be stored on one or more disk drives 103 connected to a Database Server 101. Of course, many databases are distributed over many disk drives in data centers and may, in fact, be distributed or replicated in many locations. For example, an employee of an institution may duplicate a database onto a personal computer for the purpose of being able to perform work using the database in an off-line location.

In one use case, the database 100 may contain primary account numbers (PAN) associated with the manufacture of secure portable devices, e.g., smart cards. The manufacturer of such devices maintain databases indexed using PAN. While the manufacturer protects the security of the manufacturer's database 100 using both physical and logical security, there may be a need to transport the database or portions of the database to other locations where the physical and logical security of the database places the database in a vulnerable situation. It is therefore desirable to minimize the risk associated with the possibility of a breach of database security.

A records preparer 105 prepares records for inclusion in the database 100. We depict the records preparer here as a computer 105. In reality, the records preparer may be a combination of software and hardware used by an entity to prepare records for inclusion in the database 100. For example, a national insurance system may have a web interface by which it's employees may use for adding and modifying records in the insurance system database. Records Preparer includes this combination of software and hardware.

For example, in the use case referred to above in which a manufacturer of secure portable devices maintains a database 100 indexed by PAN, there may be an application for gathering information from such databases into one central database from which issuers of the secure portable devices may track the production and issuance of cards on their behalf. A web application made available to the issuers allows for such information retrieval. However, to ensure the security of the PANs associated with the records, it is desirable to not release the database indexed using PAN, or even ModID, outside of the high-level security associated with the manufacturing database.

A records requester 107 is an entity that desires data from one or several records in the database 100. These queries or requests are forwarded to a request preparer 109, possibly through several intermediaries. As with the records preparer 105, the records requester 107 and records preparer may be a combination of software modules and hardware components that are referred to herein collectively as records requester 107 and records preparer 109, respectively.

An entity, e.g., a person, operating the records requester 107 may enter a PubID identifying the desired records. For example, a bank user may enter his or her account number to identify an account of interest. However, the records requester 107 would transform that PubID into the ModID used in the database 100, for example, by computing the appropriate hash of PubID.

Figure 3:
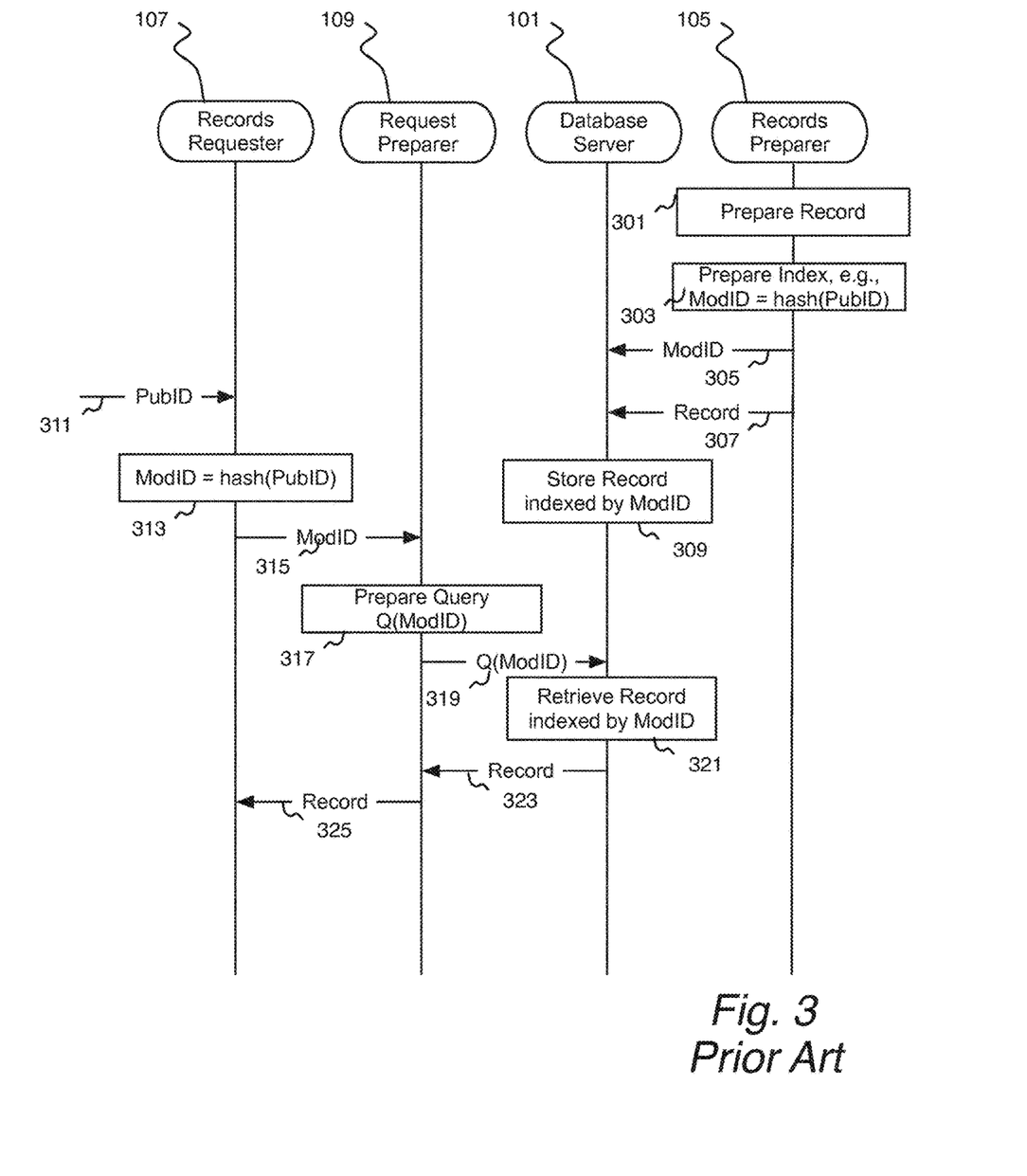
FIG. 3 is a timing sequence diagram illustrating the prior art timing sequence for preparing and storing records in the database of FIG. 2 as well as requesting records therefrom.

FIG. 3 is a timing sequence diagram illustrating the prior art timing sequence for preparing and storing records in the database 100 as well as requesting records therefrom.

Records are created by the Records Preparer 109, step 301.

The index for the record is created by the Records Preparer 109 locally using the appropriate formula, e.g., ModID=hash (PubID) or ModID=has (PubID,salt), step 303.

The ModID and the record are transmitted to the database server 101, steps 305 and 307, respectively.

The database server 101 stores the record in the database 100, step 309. The database contains data that can be:
  stored in clear text,
  decrypted by an additional data stored in the database such as an encryption key,
  decrypted using an embedded function or macro implemented, or
  weakly protected using a weak obfuscation function embedded in the database.

On the requesting end, an entity operating the records requester 107 may enter a PubID which is converted locally on the records requester 107 into ModId, steps 311 and 313.

The ModID is transmitted to the Request Preparer 105, step 315. The transmission of the ModID may be protected, for example, as there may be several intermediaries between the Records Requester 107 and the Request Preparer 105 the communication may be protected using SSL/TLS.

The Request Preparer 315 prepares an appropriate database query to retrieve the desired data, Step 317, and transmits the query indexed by ModID to the database server 101, Step 319.

The database server 101 retrieves the corresponding record from the database 100, Step 321.

The retrieved record is transmitted to the Request Preparer 105 and from there to the Records Requester 107, Steps 323 and 325, respectively.

As noted above, the ModID in this scenario is vulnerable to attack to reveal the corresponding PubID if the ModID is intercepted or the database is breached or stolen.

As noted, an entity operating the records requester 107 may enter a PubID to initiate a records request.

Figure 4:
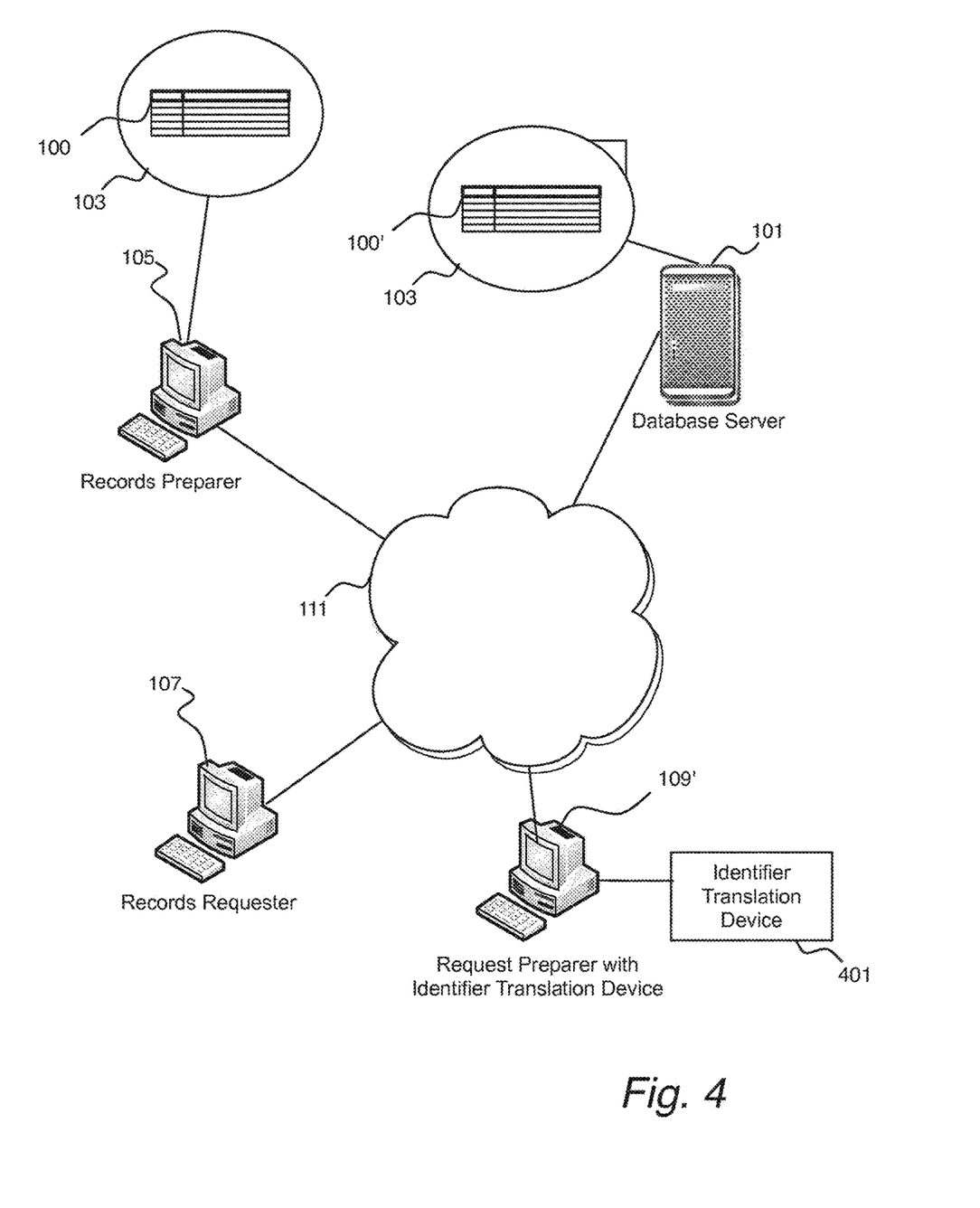
FIG. 4 is a schematic illustration of an embodiment of the invention that modifies the network illustration of FIG. 2 for the purposes of overcoming certain of the deficiencies in the former in regards to protecting PubID from being retrievable by ModID interception, database breach or database theft.

FIG. 4 is a schematic illustration of an embodiment of the invention that modifies the network illustration of FIG. 2 for the purposes of overcoming certain of the deficiencies in the former in regards to protecting PubID from being retrievable by ModID interception, database breach or database theft.

Notably, the Request Preparer 107 of FIG. 2 is extended as Request Preparer 107' which includes an Identifier Translation Device 401.

The Identifier Translation Device 401 may be a software module of the Request Preparer 107 or a physical component, e.g., a hardware-based Trusted Platform Module (TPM) or a Hardware Security Module (HSM).

Consider again the example in which a manufacturer of secure portable devices maintains a database 100 indexed using personal identifiers such as PAN, i.e., PubID. The manufacturer wishes to provide a database 100' which may be used by its customers but which does not contain a personal identifier in a fashion that is readily obtained by an attacker. Therefore, the manufacturer, i.e., the records preparer 105, translates the personal identifier indices into obfuscated identifiers (ObfID) and provides a database 100' which is thus indexed. To access the database, a customer of the manufacturer acts as a records requester 107 and transmits a records request specifying the desired records in terms of PubID or ModID (the records requester software or hardware may modify the PubID into ModID) to a request preparer 109' which is enhanced with an identifier translation device 401. Using the identifier translation device 401, the request preparer 109' formulates a query corresponding to the request in terms of obfuscated identifiers (ObfID).

Figure 5:
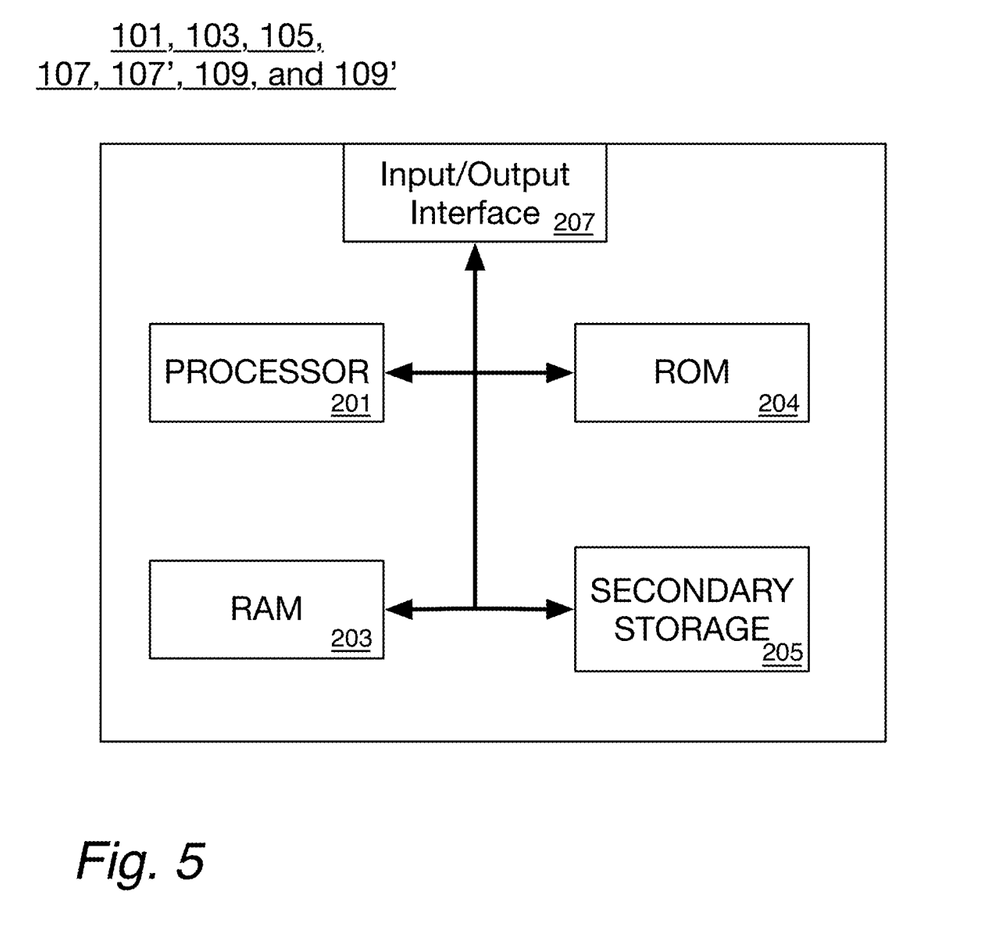
FIG. 5 is a schematic illustration of example high-level architecture of database server, records preparer, records requester, and records preparer as well as records preparer having an identifier translation device.

FIG. 5 is a schematic illustration of high-level architecture of database server 101, records preparer 105, records requester 107, and records preparer 109 as well as records preparer 109'. These devices may include a processor 201 connected via a bus 202 to a random access memory (RAM) 203, a read-only memory (ROM) 204, and a secondary storage 205. The devices 101, 105, 107, 109 and 109' further include an input/output interface 207 for connecting the processor 201, again typically via the bus 202, to peripheral devices and to other network nodes.

Figure 6:
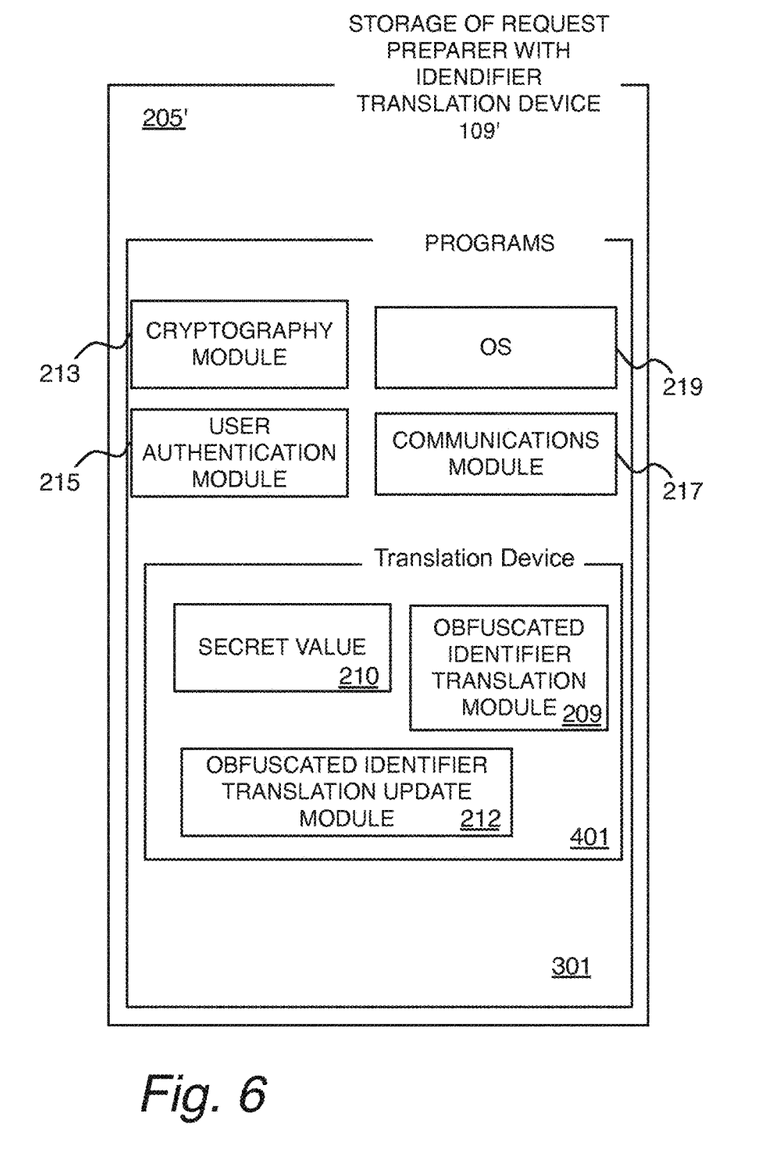
FIG. 6 illustrates the organization of the secondary storage of one embodiment of the enhanced request preparer having an identifier translation device 401 in which the secondary storage includes programs for controlling the actions of the processor and provides instructions to the processor 201 to effect the actions described herein.

FIG. 6 illustrates the organization of the secondary storage 205 of one embodiment of the enhanced request preparer 109 having an identifier translation device 401 in which the secondary storage 205 includes programs for controlling the actions of the processor 201 and provides instructions to the processor 201 to effect the actions described herein.

The secondary storage 205 and/or ROM 204 of the enhanced request preparer 109' may include computer programs 301 as is illustrated in FIG. 6. While it is here depicted that the computer programs 301 are all co-located in the ROM 204 or the Secondary Storage 205, in actual practice there is no such restriction as programs may be spread out over multiple memories and even temporarily installed in RAM 203. Furthermore, the enhanced request preparer 109' may include multiple ROMs or secondary storage devices. The programs 301 include operating system programs (e.g., a cryptography module 213, a user authentication module 215, a communications module 217, and the operating system OS 219) as well as application programs loaded on to the enhanced request preparer 109'. The secondary storage 205 or ROM 204 also contains a identifier translation device 401.

The identifier translation device 401 includes one or more secret values 210, an obfuscated identifier translation module 209, and an obfuscated identifier translation update module 212.

While the identifier translation device 401 is depicted in FIG. 6 as one of the programs stored in the program area of the secondary storage 205 of the enhanced request preparer 109', in alternative embodiments, the identifier translation device 401 may be an external device such as a TPM or a USB token.

While in FIG. 6, the update module 212 is depicted as located in the identifier translation device 401, in an alternative embodiment the obfuscated identifier translation update module 212 is located in the database 100 as is discussed in greater detail herein below.

Figure 7:
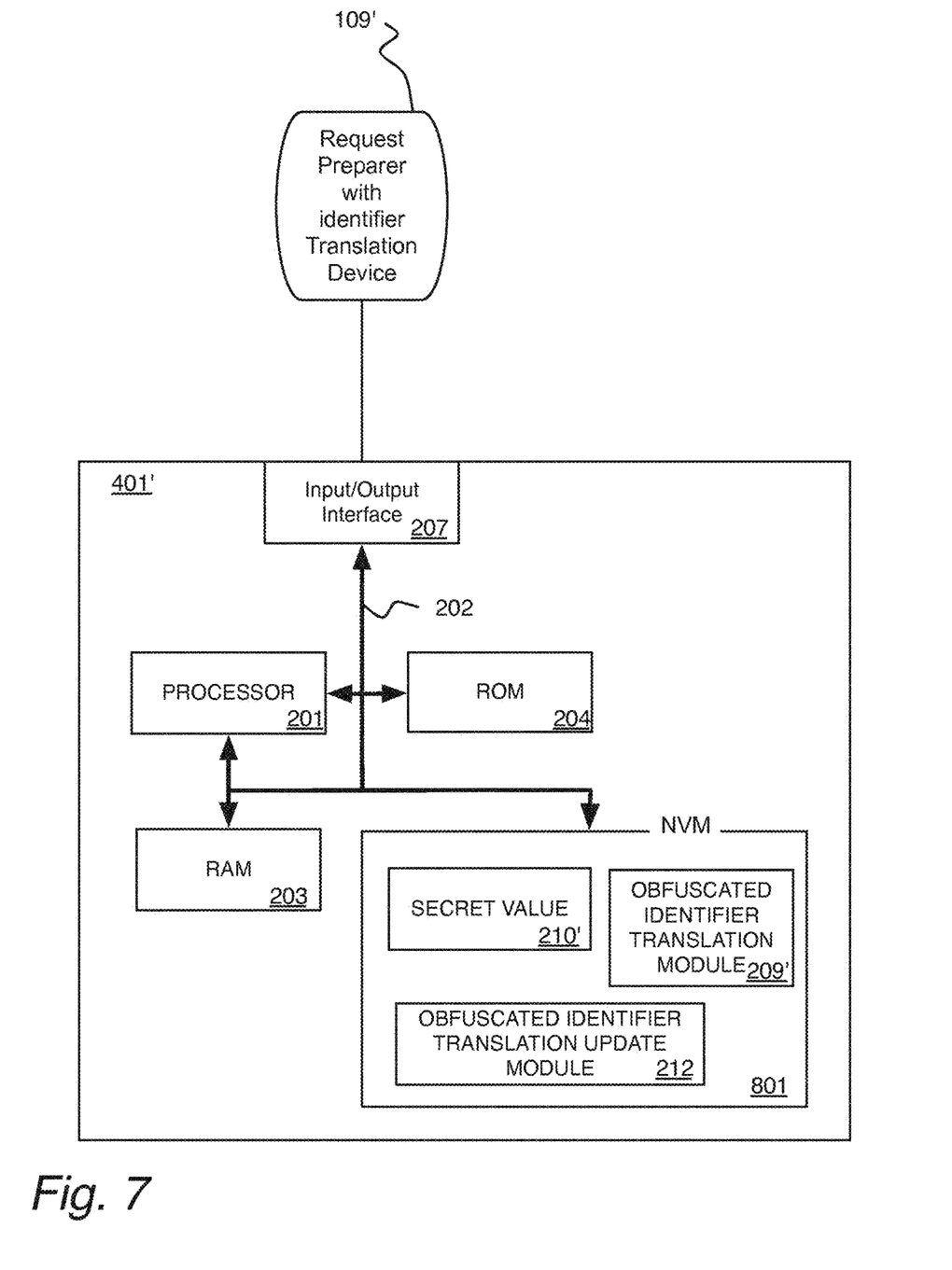
FIG. 7 is a block-diagram of an alternative implementation of the enhanced request preparer wherein an identifier translation device is implemented as an external hardware device.

FIG. 7 is a block-diagram of an alternative implementation of the enhanced request preparer 109' wherein an identifier translation device 401' is implemented as an external hardware device. In that implementation, the secret value 210' and the translation module 209' may be located in a non-volatile memory 801 of the identifier translation device 401'.

Figure 8:
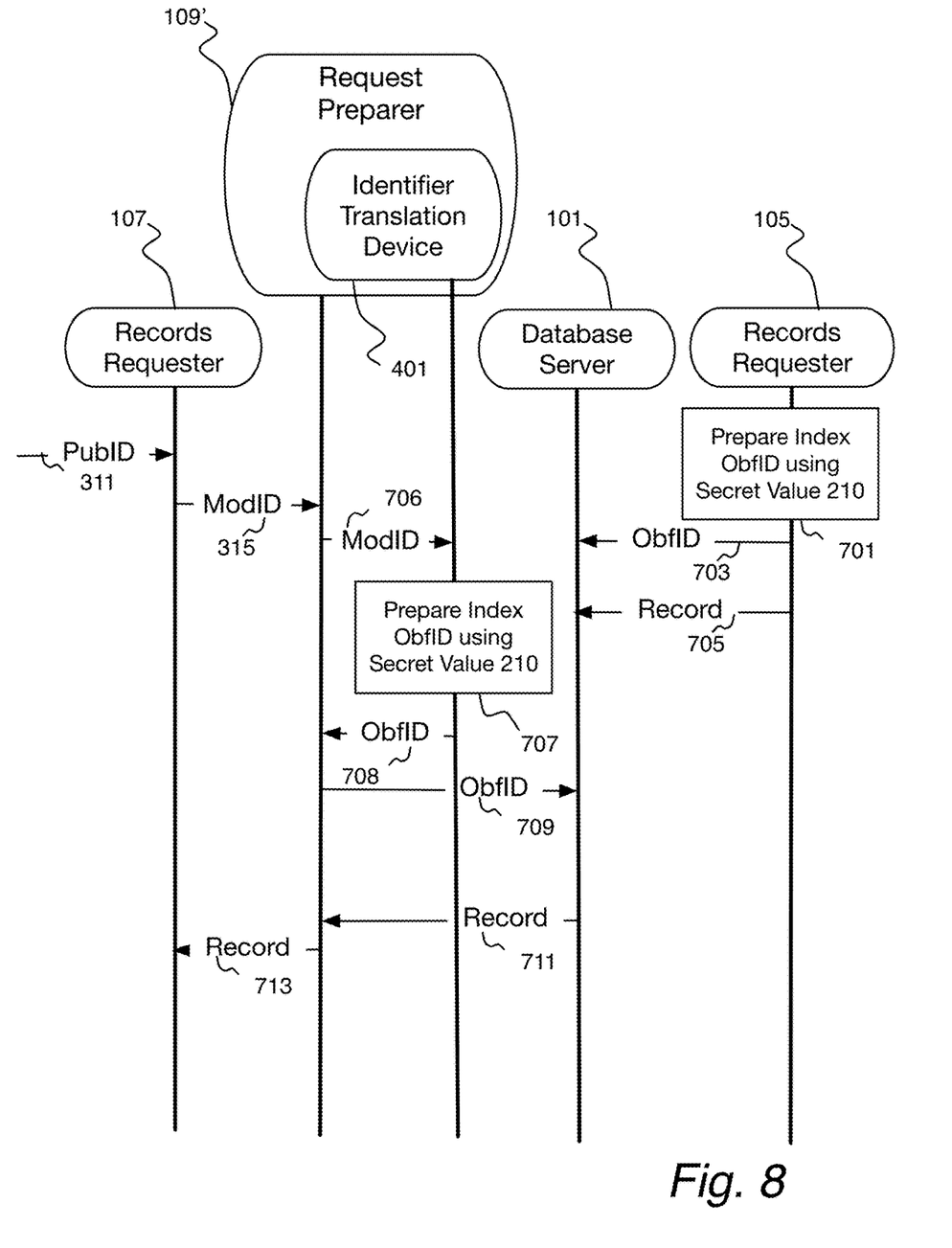
FIG. 8 is a timing-sequence diagram illustrating the message flow when the enhanced request preparer 109' takes the place of the request preparer 109 of FIGS. 2 and 3.

FIG. 8 is a timing-sequence diagram illustrating the message flow when the enhanced request preparer 109' takes the place of the request preparer 109 of FIGS. 2 and 3.

In the embodiment of FIG. 6, rather than indexing data in the database 100 using ModID as described above, the database is indexed using a new quantity ObfID (the calculation of which is described in greater detail below). Thus, the records preparer 105 computes ObfID and transmits ObfID and the prepared record to the database server 101, steps 701, 703, and 705, respectively.

On the request side, the records requester 107 operates as described above in conjunction with FIG. 3, e.g., the ModID is transmitted to the Request Preparer. However, the enhanced request preparer 109' uses the received ModID and the secret value 210 to compute the new value ObfID. Specifically, the request preparer 109' directs the identifier translation device 401 to translate the non-obfuscated personal identifier into an obfuscated personal identifier using the secret value stored in the identifier translation device, step 706. The ObfID value is computed using the obfuscation identifier translation module 209 using the secret value 210, step 707, and the ObfID value is returned to the request preparer 109', step 708.

The request preparer transmits the ObfID value to the database server 101, Step 709 and receives in response the requested record, which it forwards to the records requester 107, steps 709, 711, and 713, respectively.

The identifier translation device 401 may be a software security module or a combination of a software program and a physical secure component. The identifier translation device 401 may embed its own software security mechanisms (i.e., dedicated obfuscation and/or white-box cryptographic mechanisms to protect the secret value 210). The identifier translation module 209 may be executed in a Trusted Executed Environment (TEE) where the TEE can rely or not on a secure hardware component. Furthermore, the identifier translation device 401 may be distributed on several hardware devices that are connected according to the local network configuration. Furthermore, the identifier translation device 401 may be or use a secure hardware component, e.g. a TPM, a USB key, or a connection to a HSM (Hardware Security Module).

Thus, ObfID is computed by both the records preparer 105 and by the enhanced request preparer 109' which uses the identifier translation device 401 to compute the ObfID. The translation mechanism for translating from ModID to ObfID is not hosted in the database 100. Thus, even if the database 100 is breached or stolen, the translation method is not available to the entity that appropriated the database 100.

The records preparer 105 may computer ObfID directly from PubID whereas the identifier translation device 401 computes ObfID from ModId (may be translated by the records requester 107 from PubID if the user of the records requester 107 inputs PubID to specify desired records).

The identifier translation device 401 computes ObfID from ModId and the secret value 210.

The secret value 201 is protected from being revealed during computation. The protection may be selected from one of several techniques. For example, the translation module 209 may be obfuscated so that it is difficult to discern the computation steps performed with the secret value 210, which may in its simplest form be performing the ObfID computation in a binary executable program. Alternatively, white-box cryptography is used to protect the secret value 210 during computation of ObfID or in a key-management system. In yet another alternative, the translation module 209 is executed in a trusted execution environment (TEE) or in a TEE based on a hardware security component, i.e., the sensitive computation steps of the ObfID computation is performed in a secure hardware component such as a hardware-based trusted platform module (TPM) or in a hardware security module (HSM).

In one mechanism, the secret value 210 is tied to a specific instance of the translation device 401 such that the translation module can only be executed on a specific machine. For example, the secret value 210 is stored encrypted and the decryption key is derived from a footprint (i.e., a CRC calculation) of the particular machine that executed the translation module. Alternatively, the secret value 210 is stored on another machine of the local network in which the translation device 401 exists, e.g., on the enhanced request preparer 109', in a file that is only readable at the launch of the translation module 209' using high privileges. The secret value may then be stored in RAM from which the translation device 401 may access it. At that point, the translation device 401 may execute at lower privileges.

It is possible that the secret value 210 or the translation module 209' needs modification. For that purpose, the translation device 401 stores a translation update module 212 which may be obfuscated to protect the update mechanism from being revealed.

Figure 9:
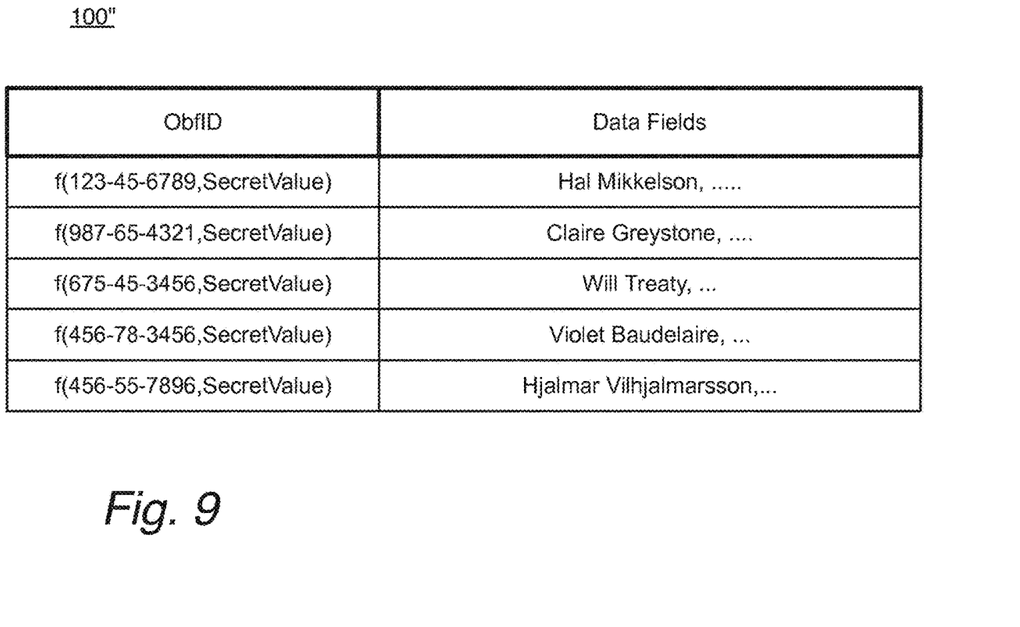
FIG. 9 illustrates an database which is indexed with ObfID obtained from ModID as illustrated in FIG. 1 and at least one Secret Value accessible using a identifier translation device.

FIG. 9 illustrates the database 100' which corresponds to the database 100 of FIG. 1 in which the database 100' is indexed with ObfID obtained from ModID as illustrated in FIG. 1 and at least one Secret Value accessible using a identifier translation device according to the mechanisms described herein.

Embodiment Using Hash Function or Block-cipher

The translation mechanism may be implemented in several different ways. A first mechanism is based on a hash function or block-cipher. It includes the following steps:

1. The user, for example, enters an identifier PubId at the record requester 107.

2. The value ModID=SHA-256(PubID||SpecificConstant) or ModID=AES-128[SpecificConstant](PubID) is computed locally. Optionally, the identifier translation device 401 has an RSA public key associated with it and the value ModID is then encrypted using the RSA public key of the identifier translation device. The SpecificConstant is a "salt" added to the calculation as described above.

3. The "identifier translation device" receives ModID (or decrypt the received ciphertext to get ModID) and possibly other data such as identification data related to the user authentication.

The request preparer 109' directs the identifier translation device 401 to translate the non-obfuscated personal identifier into an obfuscated personal identifier using the secret value stored in the identifier translation device.

4. The identifier translation device 401 executes the secured translation module 209 with identifier ModID as input to obtain the identifier ObfID.

ObfID may be calculated by the translation module 209 using any of the following functions, wherein, for each, SecretConstant is the secret value 210 that is protected so that only the identifier translation device 401 can access it:

Examples:
ObfID=SHA-256(ModID||SecretConstant||trunc(SHA224 (PubID))
ObfID=SHA-256(SecretConstant||ModID||SecondConstant||trunc(SHA224(ModID))

Wherein, the SecondConstant is a "salt" added to the SHA-256 calculation.
ObfID=HMAC-SHA-256[SecretConstant](ModID)
ObfID=AES-128[SecretConstant](ModID)

In the event that the secret value 210 and/or the specification of the translation method used by the translation module 209 requires update, the corresponding update function 212 can be hosted in the database 100. In this embodiment the update function 212 is advantageously protected using obfuscation and white-box cryptography techniques.

The confidentiality of the secret value 210 of the identifier translation device 401 is predicated on that the database 100 does not contain the translation module 209. However, the update program 212 may be housed in the database 100. When the secret value 210 is to be updated, for example, the value SV1 to SV2, the update program 212 located in the database 100 does not compute the new value of ObfID using only SV2, the update program 212 also uses as input the old value of ObfID and optionally the value ModID. for example:

If old_ObfID=AES-128[SV1](ModID), then the identifier translation device 401 provides the value Old_ObfID to the database 100 and the database 100 uses the secure update program 212 local to the database 100 to compute AES-128$^{-1}$(old_ObfID)=ModID and, for example, AES-128[SV2](ModID) if the translation function is not updated.

If old_ObfID=HMAC[SV1](ModID), then the identifier translation device 401 provides both the value Old_ObfID and ModID to the database 100 and the database 100 uses the secure update program 212 local to the database 100 to verify that Old_ObfID is correct before computing the new value of Obf_ID by using SV2.

If the database is stolen, it is not possible to exhaust the values of PubID so as to find the matching with ObfID and linked records because an attacker who obtains access to the database 100 would not have access to the Secret Value 210 (SecretConstant) because is only available on the identifier translation device 401.

However, the database 100 may include an obfuscated update program 212 to update the translation function from a given version to a new one in case the specification and/or the secret value must be changed, for example, according to life cycle rules.

First Embodiment Using Homomorphic Encryption

A second embodiment uses homomorphic encryption to calculate ObfID. In this embodiment there are two secret values 210, SV1 and SV2. The second embodiment uses the ElGamal encryption mechanism. ElGamal encryption is described in Taher ElGamal (1985). "A Public-Key Cryptosystem and a Signature Scheme Based on Discrete Logarithms". *IEEE Transactions on Information Theory* 31 (4): 469-472.

Homomorphic encryption allows specific types of operations to be performed on the ciphertext while allowing the operations result to be recovered into plaintext using the decryption operation. This property is used herein to allow updates to the ObfIDs in the database 100 when the secret values 210 are updated.

Consider the ElGamal encryption scheme:
Parameters: group G, generator g and order q
Public key $h=g^s$
Secret keys in $\{1, \ldots q-1\}$
ElGamal-Enc[h](x)=$(g^r, x \cdot h^r)$
Homomorphic property:
ElGamal-Enc[h]($x_1$)*ElGamal-Enc[h]($x_2$)=ElGamal-Enc[h]($x_1 \cdot x_2$)  $(g^{r1}, x_1 \cdot h^{r1})*(g^{r2}, x_2 \cdot h^{r2})=(g^{r1+r2}, x_1 \cdot x_2 \cdot h^{r1+r2})$ The first three steps are the same as in the Embodiment using hash function or block-cipher described above.

4. The identifier translation device 401 executes the obfuscated translation module 209 on input ModID to compute the identifier ObfID=$x \cdot h^r$ where: r=(f1(ModID)+SV1) mod q and x=(f2(ModID, SV2)) in G, where f1 and f2 are two arbitrary functions.

5. At least one of SV1 and SV2 may be stored in the RAM of the identifier translation device 401 and accessed by the translation module 209 from there during the execution of the computation of ObfID. The secret value (SV1 or SV2) loaded into RAM is copied, for example, from a local file, or from a TPM, a USB token, or manipulated in a connected HSM. There are alternative protection mechanisms for protecting SV1 and S 2, e.g., as described above, obfuscation of the translation module 209, white-box cryptography to protect the secret values SV1 and SV2, execution of the translation module 209 in a trusted environment, and connection of a remote hardware security module.

6. In case the secret values and/or the specification of the translation method have to be changed, the corresponding update function 212 can be hosted in the database 100. When the secret value SV1 has to be updated and replaced by SV1*, the update function consists in performing a multiplication between ObfID=(f2(ModID,SV2)·$h^{f1(ModID)+SV1}$) and $h^{(SV1*-SV1)}$ to get the new value ObfID*=f2(ModID, SV2)·$h^{f1(ModID)+SV1*}$). Note that a single value $h^{(SV1*-SV1)}$ can be used to update the full database. In that specific case, the implementation of the update function does not require to be protected using obfuscation techniques or white-box cryptography techniques because of the use of homomorphic encryption; the value $h^{(SV1*-SV1)}$ is provided to the database 100 and then the database 100 can compute the new values of ObfID using the old values of ObfID.

As with the previous embodiment, if the database is stolen, it is not possible to exhaust the values of PubID so as to find the matching with ObfID and linked records because an attacker who obtains access to the database 100 would not have access to the Secret Value 210 (SecretConstant) because is only available on the identifier translation device 401.

Furthermore, the database 100 may include an obfuscated update program 212 to update the translation function from a given version to a new one in case the specification and/or the secret value must be changed, for example, according to life cycle rules.

Embodiment Using Homomorphic Decryption

This embodiment is similar to the prior embodiment using homomorphic encryption and is also based on ElGamal encryption. The first three steps are the same as in the prior embodiments.

4. The identifier translation device 401 executes the obfuscated translation module 209 on input ModID to obtain the identifier ObfID=$(g^r, x \cdot h^r)$ where: r=f1(ModID,SV1) mod q and x=f2(ModID, SV2) in G, where f1 is a nonlinear function in the variable SV1 and f2 is invertible (e.g., f2 is a linear function or f2 is based on a block-cipher). From that it is possible to decrypt ObfID to recover ModID using the secret value s; the secret value s is managed either by the identifier translation device 401 or by an additional entity, for example, a TPM.

The update step 5 is identical to the update step of the previous embodiment.

For the embodiments that use homomorphic encryption and decryption, other encryption schemes with homomorphic properties can be used such as unpadded RSA (RSA-ENC(x)=$x^e$ mod n and RSA-ENC($x_1$)*RSA-ENC($x_2$)= RSA-ENC($x_1*x_2$)) or Goldwasser-Micali, (Described in S. Goldwasser, S. Micali (1984). "Probabilistic encryption". *Journal of Computer and System Sciences*. 28 (2): 270-299., Benaloh, J.: *Dense Probabilistic Encryption*. In: *Proceedings of the Workshop on Selected Areas of Cryptography*, pp. 120-128 (1994) or Paillier (Described in Pailier, Pascal, Public-Key Cryptosystems Based on Composite Degree Residuosity Classes, Published in J. Stern, Ed., Advances in Cryptology—EUROCRYPT '99, vol. 1592 of Lecture Notes in Computer Science, pp. 223-238, Springer-Verlag, 1999).

Hereinabove a technology is described that protects personal identifiers from being inappropriately obtained from interception of a database index, e.g., ModID, or the breach or theft of a database. The technique provides a mechanism by which personal identifiers are obfuscated using secret value(s) that are not accessible in the database and without which the source personal identifier may not be obtained.

Although specific embodiments of the invention have been described and illustrated, the invention is not to be limited to the specific forms or arrangements of parts so described and illustrated. The invention is limited only by the claims.

The invention claimed is:

1. A method of operating a database system to protect personal identifiers from being revealed, comprising:
for storing a record in a database of the database system:
obfuscating a personal identifier using a secret value;
storing in a database records containing the obfuscated personal identifier;
storing the secret value in an identifier translation device;
for retrieving a requested record from the database of the database system:
operating a records requester to modify the personal identifier of the requested record into a modified personal identifier and transmitting the modified personal identifier to a request preparer;
receiving at a request preparer the record request identifying the requested record using the modified personal identifier; and
operating the request preparer to direct the identifier translation device to translate the modified personal identifier into an obfuscated personal identifier corresponding to the obfuscated personal identifier used to store the record in the database of the database system using the secret value stored in the identifier translation device and using the obfuscated personal identifier in a query to the database.

2. The method of operating a database system of claim 1 wherein the identifier translation device is a peripheral device connected to the request preparer through a communications interface.

3. The method of operating a database system of claim 1 wherein the identifier translation device is a peripheral device is a trusted platform module.

4. The method of operating a database system according to claim 1, further comprising storing the secret value in an obfuscated identifier translation module.

5. The method of operating a database system according to claim 1 further comprising protecting the secret value on the identifier translation device using white box cryptography.

6. The method of operating a database system according to claim 1 further comprising storing the secret value on the identifier translation device in an identifier translation module executing within a trusted execution environment.

7. The method of operating a database system according to claim 1 further comprising protecting the secret value by linking the secret value to a specific instance of the identifier translation device such that a translation module performing the translation of the modified personal identifier into an obfuscated personal identifier using the secret value stored in the identifier translation device can only successfully execute on one specific identifier translation device.

8. The method of operating a database system according to claim 1 further comprising storing the secret value on a second machine on a same local network as the identifier translation device in a file readable on launch of a translation module performing the translation of the modified personal identifier into an obfuscated personal identifier using the secret value stored in the identifier translation device using high privileges and storing the secret value in RAM.

9. The method of operating a database system according to claim 1 wherein the translation of the modified personal identifier into an obfuscated personal identifier using the secret value stored in the identifier translation device is performed using a hash function or a block cipher.

10. The method of operating a database system according to claim 1 wherein the translation of the non-obfuscated personal identifier into an obfuscated personal identifier using the secret value stored in the identifier translation device is performed using homomorphic encryption.

11. The method of operating a database system according to claim 10 further comprising updating the secret value and updating all obfuscated personal identifier values stored in the database by using an operation that is homomorphic on the obfuscated personal identifier values.

12. A system for storing and retrieving data from a database, comprising:
a database containing records including an obfuscated personal identifier wherein the obfuscated personal identifier is a function of a non-obfuscated personal identifier and a secret value and corresponds to a modified personal identifier;
an identifier translation device having a processor and a memory storing the secret value and a module that translates a modified personal identifier into an obfuscated personal identifier using the secret value; and
a request preparer operable to:
receive a modified personal identifier and upon receiving the modified personal identifier:
calling upon the identifier translation device to translate the modified personal identifier into an obfuscated personal identifier using the secret value stored in the identifier translation device and the modified personal identifier; and formulate a query to the database using the obfuscated personal identifier and to transmit the query to the database.

13. The system for storing and retrieving data from a database of claim 12 wherein the identifier translation device is a peripheral device connected to the request preparer through a communications interface.

14. The system for storing and retrieving data from a database of claim 12 wherein the identifier translation device is a peripheral device is a trusted platform module.

15. The system for storing and retrieving data from a database according to claim 12, further comprising an obfuscated identifier translation module storing the secret value.

16. The system for storing and retrieving data from a database according to claim 12 wherein the secret value is protected on the identifier translation device using white box cryptography.

17. The system for storing and retrieving data from a database according to claim 12 further comprising an identifier translation module executing within a trusted execution environment wherein the identifier translation module stores the secret value on the identifier translation device.

18. The system for storing and retrieving data from a database according to claim 12 wherein the secret value is protected by linking the secret value to a specific instance of the identifier translation device such that a translation module performing the translation of the modified personal identifier into an obfuscated personal identifier using the secret value stored in the identifier translation device can only successfully execute on one specific identifier translation device.

19. The system for storing and retrieving data from a database according to claim 12 further comprising the secret value being stored on a second machine on a same local network as the identifier translation device in a file readable on launch of a translation module performing the translation of the modified personal identifier into an obfuscated personal identifier using the secret value stored in the identifier translation device using high privileges and storing the secret value in RAM.

20. The system for storing and retrieving data from a database according to claim 12 wherein the translation of the modified personal identifier into an obfuscated personal identifier using the secret value stored in the identifier translation device is performed using a hash function or a block cipher.

21. The system for storing and retrieving data from a database according to claim 12 wherein the translation of the modified personal identifier into an obfuscated personal identifier using the secret value stored in the identifier translation device is performed using homomorphic encryption.

22. The system for storing and retrieving data from a database according to claim 21 further comprising updating the secret value and updating all obfuscated personal identifier values stored in the database by using an operation that is homomorphic on the obfuscated personal identifier values.

* * * * *